United States Patent
Huber

(10) Patent No.: US 9,414,096 B2
(45) Date of Patent: Aug. 9, 2016

(54) METHOD AND APPARATUS FOR PROCESSING MULTISTREAM CONTENT

(75) Inventor: Michael Huber, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/391,680

(22) PCT Filed: Apr. 13, 2012

(86) PCT No.: PCT/EP2012/056774
§ 371 (c)(1),
(2), (4) Date: Oct. 9, 2014

(87) PCT Pub. No.: WO2013/152800
PCT Pub. Date: Oct. 17, 2013

(65) Prior Publication Data
US 2015/0067747 A1    Mar. 5, 2015

(51) Int. Cl.
| | |
|---|---|
| H04N 7/173 | (2011.01) |
| H04N 21/235 | (2011.01) |
| H04N 5/445 | (2011.01) |
| H04N 21/218 | (2011.01) |
| H04N 21/2362 | (2011.01) |
| H04N 21/2368 | (2011.01) |
| H04N 21/431 | (2011.01) |
| H04N 21/434 | (2011.01) |
| H04N 21/643 | (2011.01) |
| H04N 21/2365 | (2011.01) |
| H04N 21/485 | (2011.01) |
| H04N 21/236 | (2011.01) |
| H04N 21/61 | (2011.01) |

(52) U.S. Cl.
CPC ....... *H04N 21/2353* (2013.01); *H04N 5/44591* (2013.01); *H04N 21/21805* (2013.01); *H04N 21/2362* (2013.01); *H04N 21/2365* (2013.01); *H04N 21/2368* (2013.01); *H04N 21/23614* (2013.01); *H04N 21/4316* (2013.01); *H04N 21/4345* (2013.01); *H04N 21/4348* (2013.01); *H04N 21/4858* (2013.01); *H04N 21/6112* (2013.01); *H04N 21/64322* (2013.01)

(58) Field of Classification Search
CPC ............ H04N 21/235; H04N 21/2353; H04N 21/23614; H04N 5/44591; H04H 20/28
See application file for complete search history.

(56) References Cited

U.S. PATENT DOCUMENTS

| | | | | |
|---|---|---|---|---|
| 8,166,503 | B1 * | 4/2012 | Rosenberg | H04N 21/234327 725/109 |
| 2011/0216015 | A1 * | 9/2011 | Edwards | G06F 3/041 345/173 |
| 2012/0269207 | A1 * | 10/2012 | Jang | H04N 21/4345 370/535 |

FOREIGN PATENT DOCUMENTS

| | | |
|---|---|---|
| EP | 1936961 A2 | 6/2008 |
| WO | 2012009246 A1 | 1/2012 |

* cited by examiner

Primary Examiner — Nathan Flynn
Assistant Examiner — James R Marandi
(74) Attorney, Agent, or Firm — Rothwell, Figg, Ernst & Manbeck, P.C.

(57) ABSTRACT

There is provided a data stream comprising a plurality of program streams and at least one multistream descriptor. The multistream descriptor defines a multistream group identifier; and the identity of the program streams that are members of the multistream group.

17 Claims, 7 Drawing Sheets

METHOD AND APPARATUS FOR PROCESSING MULTISTREAM CONTENT

CROSS REFERENCE TO RELATED APPLICATION(S)

This application is a 35 U.S.C. §371 National Phase Entry Application from PCT/EP2012/056774, filed Apr. 13, 2012, designating the United States, the disclosure of which is incorporated herein in its entirety by reference.

TECHNICAL FIELD

The present application relates to a data stream, a device for receiving a data stream, an encoder, a method for creating a data stream, and a computer-readable medium.

BACKGROUND

Television (TV) programming may be delivered to a receiving device by a variety of means. Delivery mechanisms in use today include terrestrial broadcast, satellite broadcast, cable, and IPTV (internet protocol television, which may be delivered via an IP network). Historically, analogue transmission schemes were used, but increasingly digital transmission schemes are displacing these. Digital transmission schemes typically follow the Digital Video Broadcasting (DVB) standards. Regardless of the delivery mechanism, a receiving device receives and decodes the transmission signal. The receiving device can be incorporated into a display (a television) or may be arranged to be connected to a display device (a set-top box, STB).

Today's STBs and televisions can show more then one channel at a time, if one channel is displayed at the same time as another it is called picture in picture (PIP). The STBs and televisions that are being manufactured now can handle many simultaneous streams, which could allow a number of interesting features. One such feature is to display views of an event from many different camera angles at the same time. It should be noted that the usefulness of such a feature increases with the prevalence of high definition televisions, but such a television is not required for these features to be useful.

A problem with delivering such multistream content to users is that it is difficult to provide a scalable solution given the practical limitations of the TV distribution system. Today, no content is created for distribution in this way, primarily because existing attempts to deploy multi-stream features have been created by different middleware manufacturers attempting to setup players in a receiving device and to provide a user interface to allow the user to move channels around on the screen.

However, such a service is limited to the middleware manufacturer's system, and content creators would be required to provide multistream content tailored for each middleware solution, which would be a lengthy process. Because of this split in responsibility between content creation and content distribution, proprietary middleware multistream solutions have not been successful.

Accordingly, there is a need for an improved method and apparatus for multistream content.

SUMMARY

There is provided a data stream comprising a plurality of program streams and at least one multistream descriptor. The multistream descriptor defines a multistream group identifier, and it defines the identity of the program streams that are members of the identified multistream group.

By including a multistream descriptor in a data stream, a compatible decoder can display multiple streams at once, in a manner defined by the content distributor and/or creator. Advantageously, an incompatible decoder may ignore the multistream descriptor, but still display the member program streams of the multistream group.

The multistream group may comprise a plurality of program streams for simultaneous display. The multistream descriptor may further define the display arrangement of the plurality of program streams for simultaneous display. The multistream descriptor may further define a desired picture size of each program stream that is a member of the multistream group. The multistream descriptor may further define a desired picture position of each program stream that is a member of the multistream group. By including such a multistream descriptor in a data stream, the content distributor and/or creator can define the arrangement of the multiple streams on the display.

The multistream descriptor further includes an indicator to determine whether a user can modify the display arrangement. An indicator determining whether a user can modify the display arrangement, or not, allows a content creator or distributor to control how a user interacts with the multistream content. Some content may be intended for only a particular display arrangement, such as a view provided by a low-resolution camera would not be suitable for full-screen display.

The multistream descriptor may further include the priority of different streams in the stream group. By including the priority, the effect of any disruption in communication or processing may be limited, such that the least important stream is interrupted in preference to maintaining the most important stream.

The multistream descriptor may further include an audio identifier to indicate which audio stream is to be played in conjunction with the multistream group. The multistream group may define a plurality of video streams and their arrangement for simultaneous playback. The multistream descriptor may define which audio stream is played with the multistream video content. The audio stream may be one associated with a video stream of the multistream group. The audio stream may be a dedicated audio stream for the multistream group. In the absence of an indicated audio stream, the audio stream associated with a dominant video stream of the multistream group may be selected for playback.

The multistream descriptor may be repeated within the data stream. The multistream descriptor may be repeated within the data stream several times a second.

The data stream may be a transport stream. The transport stream may be an MPEG (Moving Picture Experts Group) transport stream.

The multistream descriptor may be included in a Program Association Table, a Program Map Table, or a private data packet. The PAT or PMT may be a part of an MPEG data stream. The multistream descriptor may be pointed to by the PAT or PMT. The multistream descriptor may be included in a new table.

The multistream descriptor may be included within one of the program streams. The data stream may be an adaptive stream, and the multistream descriptor may be included within a manifest. The adaptive stream may be an HTTP adaptive stream There is further provided a device for receiving a data stream, the device comprising a receiver, a processor and an output. The receiver is arranged to receive a data stream comprising a plurality of program streams and a multistream descriptor. The processor is arranged to decode the group of streams indicated by the multistream descriptor. The output is arranged to output the group of streams as indicated by the multistream descriptor.

The output may comprise a video display that is part of the device or a connection for a video display screen to be connected to the device. The output may further comprise a speaker that is part of the device or a connection for an audio component to be connected to the device.

The multistream descriptor may comprise: a multistream group identifier; and the identity of the program streams that are members of the multistream group.

There is further provided an encoder, the encoder arranged to receive a plurality of video and audio streams. The encoder is further arranged to encode the video and audio streams to generate a data stream. The encoder is further arranged to receive a multistream arrangement comprising an arrangement of at least a plurality of the received video streams. The encoder is further arranged to encode the multistream arrangement in a multistream descriptor; and to insert the multistream descriptor into the data stream.

There is provided a further encoder, the encoder arranged to receive an encoded data stream comprising a plurality of program streams. The encoder further arranged to receive a multistream arrangement comprising an arrangement of at least a plurality of the received program streams. The encoder is further arranged to encode the multistream arrangement in a multistream descriptor; and to insert the multistream descriptor into the encoded data stream.

There is further provided a method for creating a data stream including a multistream descriptor. The method comprises receiving a plurality of video and audio streams, and encoding the video and audio streams to generate a data stream. The method further comprises receiving a multistream arrangement comprising an arrangement of at least a plurality of the received video streams. The method further comprises encoding the multistream arrangement in a multistream descriptor; and inserting the multistream descriptor into the data stream.

There is further provided a computer-readable medium, carrying instructions, which, when executed by computer logic, causes said computer logic to carry out any of the methods defined herein. There is further provided a computer-readable storage medium, storing instructions, which, when executed by computer logic, causes said computer logic to carry out any of the methods defined herein.

BRIEF DESCRIPTION OF THE DRAWINGS

An improved method and apparatus for multistream content will now be described, by way of example only, with reference to the accompanying drawings, in which.

DETAILED DESCRIPTION

Figure 1:
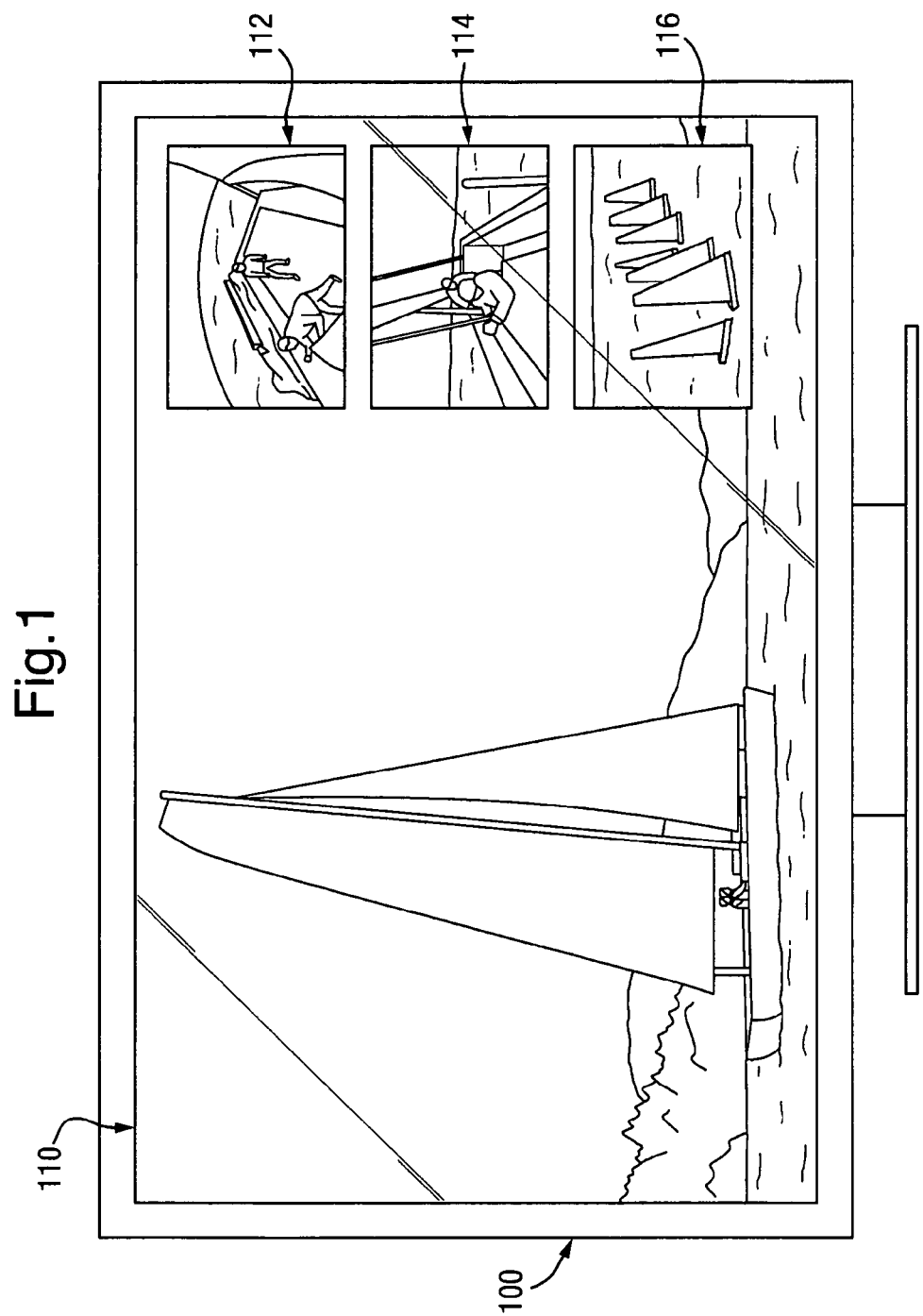
FIG. 1 illustrates a display device showing multiple views of a sporting event in a multi-stream arrangement.

FIG. 1 illustrates a display device 100 showing multiple views of a sporting event, in this case a yacht race, in a multistream arrangement. A main picture 110 of one of the yachts fills the display of display device 110. Inset in the display are three alternative views, these views are arranged in a column to the right hand side of the screen. The three inset views are: a view 112 of the deck of a yacht, a view 114 of the bow of a yacht, and an aerial view 116 of a number of the yachts. Each view, 110, 112, 114 and 116 is streamed separately to the receiving device, decoded and displayed in accordance with a multistream descriptor which is received by the receiving device.

According to the method and apparatus disclosed herein, a multistream descriptor is inserted into the data stream containing streams of multiple views. The multistream descriptor tells the receiving device how to arrange the multiple views on the display.

Figure 2:
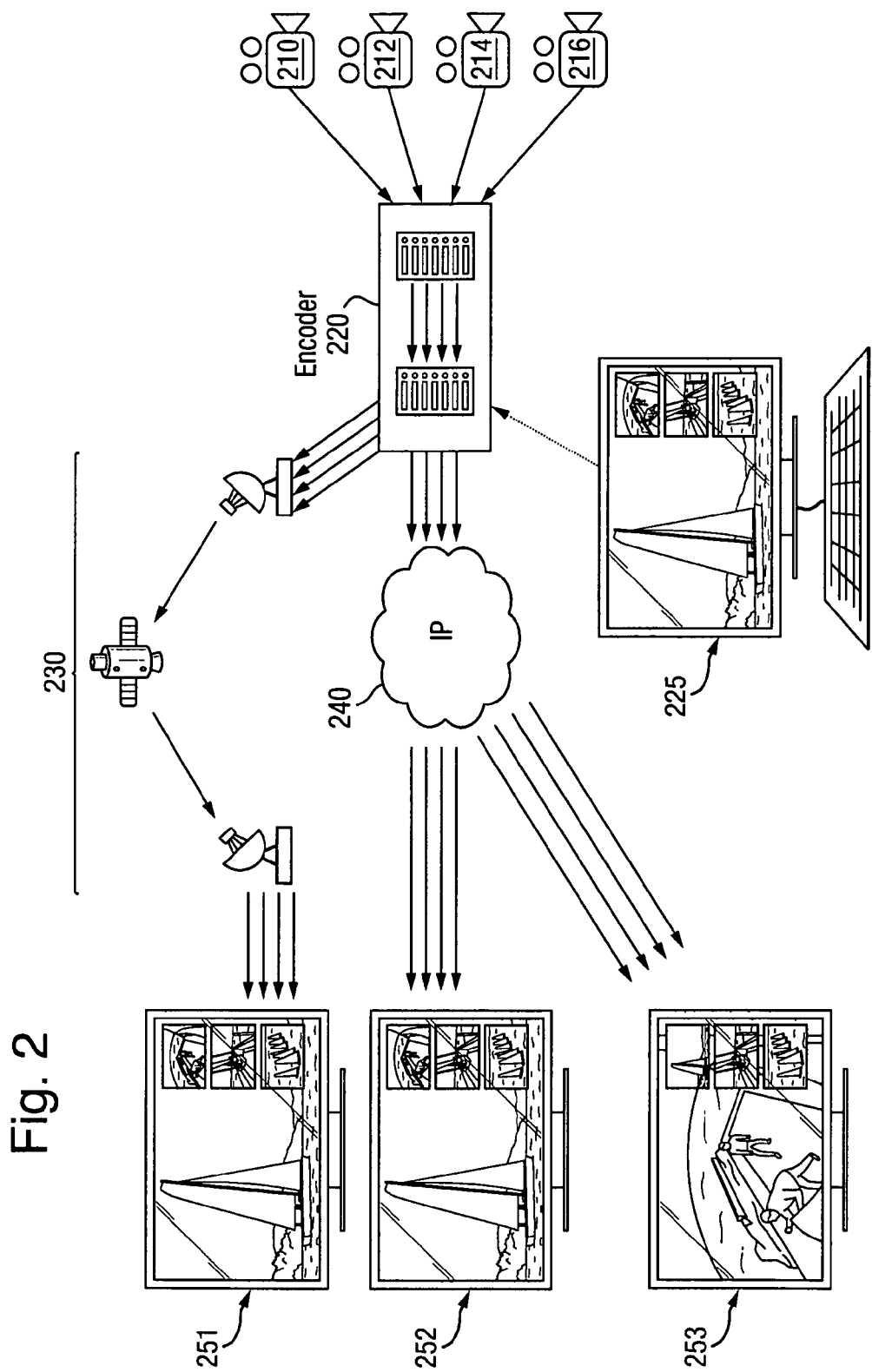
FIG. 2 illustrates a system for distributing the multiple view content exemplified in FIG. 1.

FIG. 2 illustrates a system for distributing the multiple view content exemplified in FIG. 1. Multiple views are captured by multiple respective cameras 210, 212, 214, and 216. The captured views are passed to an encoder 220, which encodes the received video using a suitable codec such as MPEG2. An input terminal 225 is used to edit and arrange the multiple views to create arrangement information. This arrangement information is passed to the encoder 220 and encoded as a multistream descriptor in the encoded data stream output by encoder 220. The encoded data stream comprising the multiple views and the multistream description is transmitted to receiving devices via a satellite broadcast 230 or over an IP network 240. Each connected receiver receives the multistream content, decodes it and displays the multistream content on a respective display 251, 252 and 253.

In the example shown, the multistream descriptor indicates that the user may change the arrangement of the views. The receiver connected to display 253 has changed the arrangement of the multiple views such that views 110 and 112 as shown in FIG. 1 are switched.

The encoded data stream may contain program streams other than the multiple view content, such as a broadcast multiplex wherein each data stream comprises a multiplex of different program streams.

Figure 3:
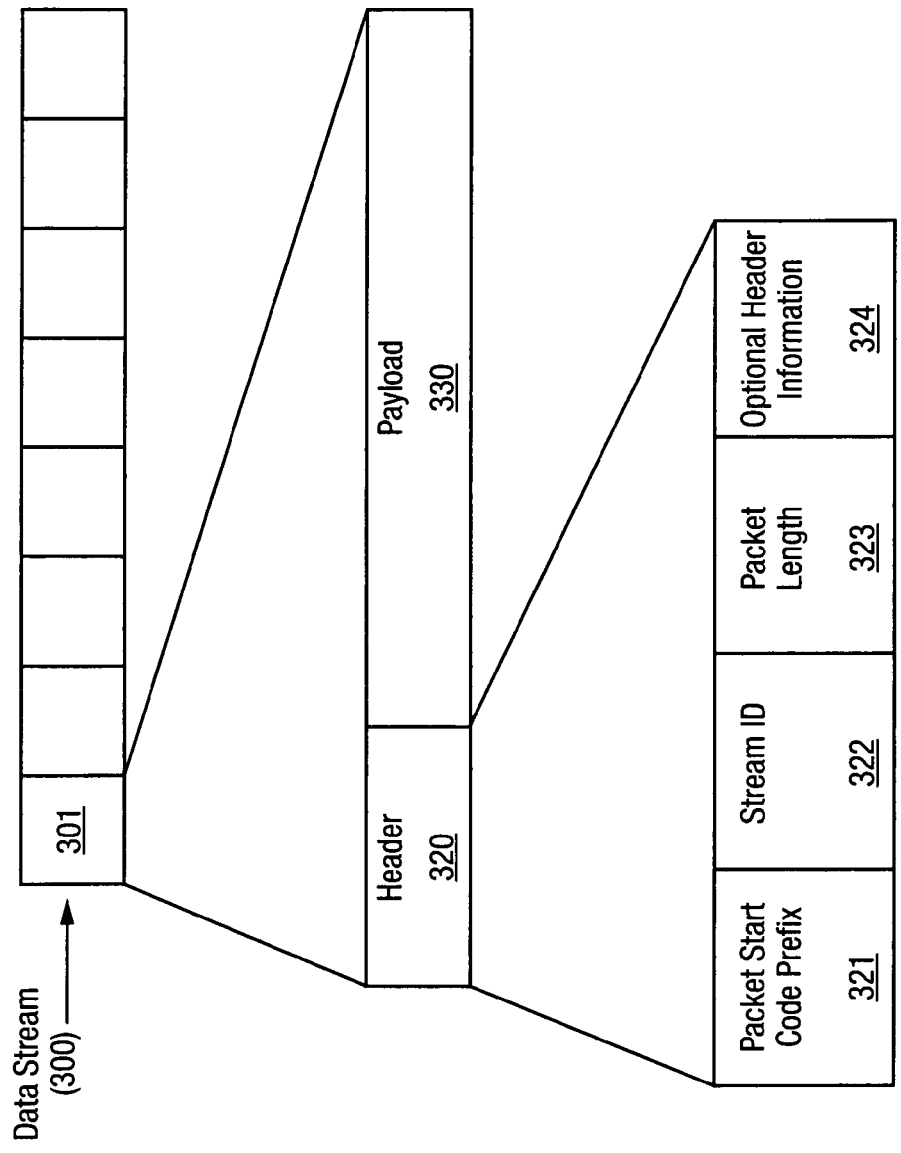
FIG. 3 shows an example of a data stream.

The multistream descriptor is inserted into the data stream containing the individual streams of each view. An example data stream 300 is shown in FIG. 3. The data stream 300 comprises a series of packets, 301. Each packet 301 comprises a header 320 and a payload 330. The header 320 comprises a packet start code prefix 321, a stream ID 322, a packet length indicator 323, and any optional header information 324.

Figure 4:
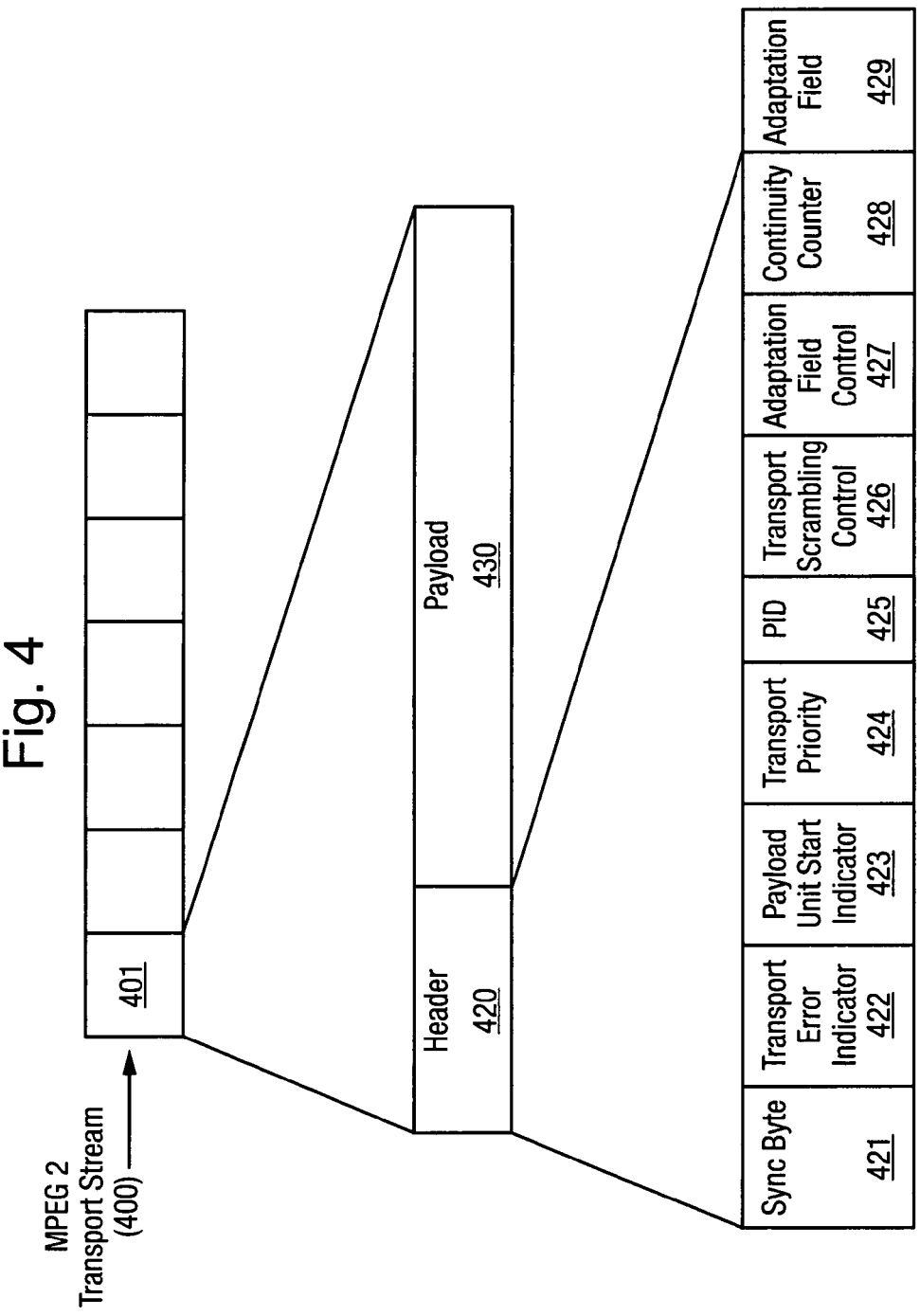
FIG. 4 illustrates an mpeg transport stream.

Below, reference is made to the mpeg transport stream to illustrate an example implementation. An mpeg transport stream 400 is illustrated in FIG. 4. The transport stream 400 comprises a series of packets, 401, each having 188 bytes. Each packet 401 comprises a 4-byte header 420 and a 184-byte payload 430. The header 420 comprises a sync byte 421, a transport error indicator 422, a payload unit start indicator 423, a transport priority 424, a packet identifier 425, a transport scrambling control 426, an adaptation field control 427, a continuity counter 428, and an adaptation field 429.

Mpeg transport streams are used to transport video, audio and text packets in IPTV as well as terrestrial, satellite and cable TV digital broadcast networks. The payload of a transport stream packet is normally used for video or audio payload. Some packets comprise other payload information like the PAT (Program Association Table) and the PMT (Program Map Table) are used to keep track of the different packet types in a stream.

To keep track of different types of packets a unique packet identifier is assigned for each service, for example:

| Packet name | Packet ID (PID) |
|---|---|
| PAT (Program Association Table) | 0 |
| PMT (Program Map Table) | 101 |
| Video | 201 |
| Audio | 301 |

Some packets inside the stream, like PAT, have a hard coded PID (Packet ID), while others have dynamically assigned PIDs. The PAT (Program Association Table) is the first entry point for dynamically assigned PIDs and it points out one or more PMTs. A PMT keeps track of the programs different audio, text and video elements. Different standards have different hard coded PIDs. For example, in DVB, PID 12 is an Event Information Table (EIT) that is hard coded, while in ATSC PID 12 does not necessarily refer to EIT.

The multistream descriptor that is added into the data stream or the transport stream can be added as a descriptor inside one of the existing tables or it can be added as a private data package on its own PID, either hardcoded or dynamically added inside the stream.

The multistream descriptor should be added at least once per second, and at least a couple of times a second in a live stream that people can join and leave as they please.

An embodiment of the multistream descriptor described herein is composed as follows:

```
multistream_desc
{
    Master_stream_id       = <Unique stream id>
    User_can_modify        = <0/1>
    Audio_master           = <Null / stream to determine what
audio to play if not the same...>
        Number_of_streams = <Number of stream in bundle>
        For (Number_of_streams)
        {
            stream_id = <Unique stream id lice mc address or dvb
            triplet>
                                   Priority = <If client cant show all
stream what prio has this>
            Coordinates x,y,z = <x,y,z pixel coordinates from top
corner of screen>
                Width = <width in pixels>
                    Height = <height in pixels >
        }
}
```

Figure 5:
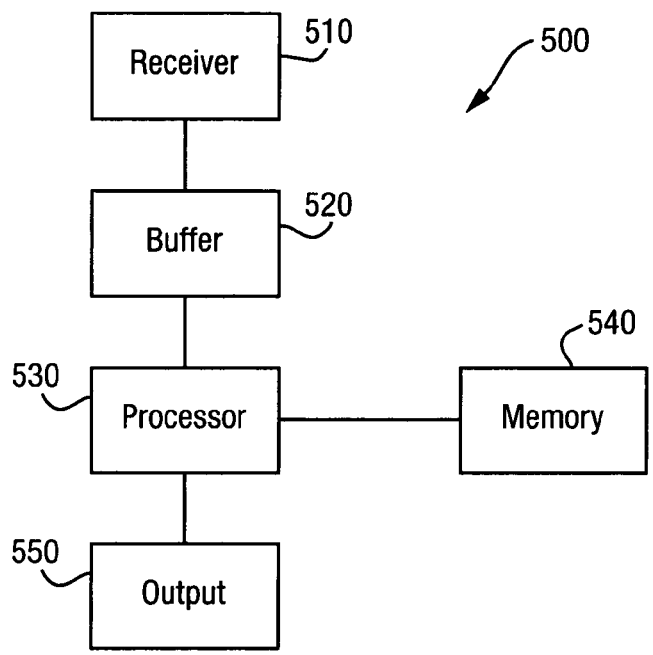
FIG. 5 illustrates a device for receiving a data stream including a multistream descriptor.

FIG. 5 illustrates a device 500 for receiving a data stream including a multistream descriptor as described above. The device 500 comprises a receiver 510, a buffer 520, a processor 530, a memory 540, and an output 550.

In operation, the receiver 510 receives the encoded data stream and stores this in a buffer 520. The processor 530 reads the data stream from the buffer 520 and decodes the appropriate components of the data stream. The processor 530 is arranged to receive instructions which, when executed, causes the processor 530 to carry out the above described method. The instructions are stored on the memory 540. During decoding, the processor 530 receives the multistream descriptor and uses this to determine which streams to decode and how to arrange the decoded streams for display. The decoded program is sent to an output 550. The outputting may comprise displaying on a video display that is part of the device 500 or a video display screen that is connected to the device 500.

Figure 6:
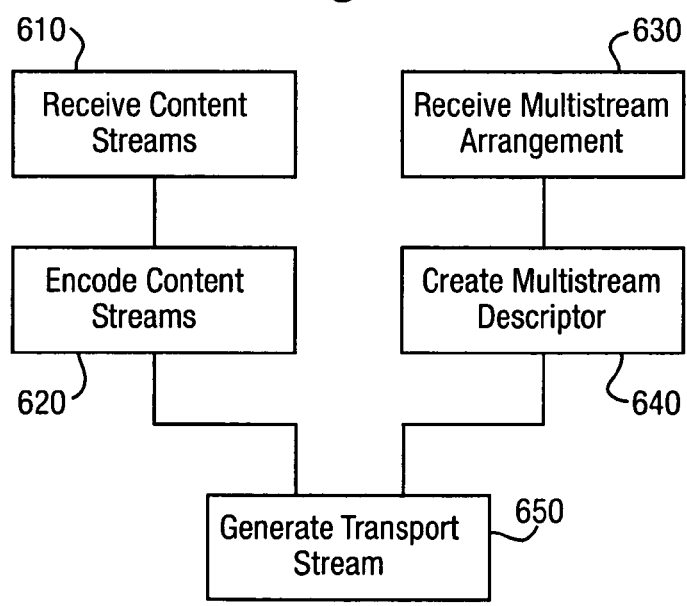
FIG. 6 illustrates a method for creating a data stream including a multistream descriptor.

FIG. 6 illustrates a method for creating a data stream including a multistream descriptor. The method comprises receiving 610 a plurality of content streams which may comprise program streams or simply video and audio streams. The method further comprises encoding 620 the video and audio streams. The method further comprises receiving 630 a multistream arrangement comprising an arrangement of at least a plurality of the received video streams, and encoding 640 the multistream arrangement in a multistream descriptor. The method further comprises combining the multistream descriptor with the encoded program streams to generate the data stream.

It should be noted that the encoding of the multistream arrangement may be performed in a different server to that which the program streams are encoded. That is, a first data stream comprising the encoded program streams is created in one server, sent to a second server which also receives the multistream arrangement information, and in which the multistream descriptor is created and inserted into the first data stream to generate a second data stream, which includes both the program streams and the multistream arrangement. These two alternatives are shown in FIGS. 7 and 8.

Figure 7:
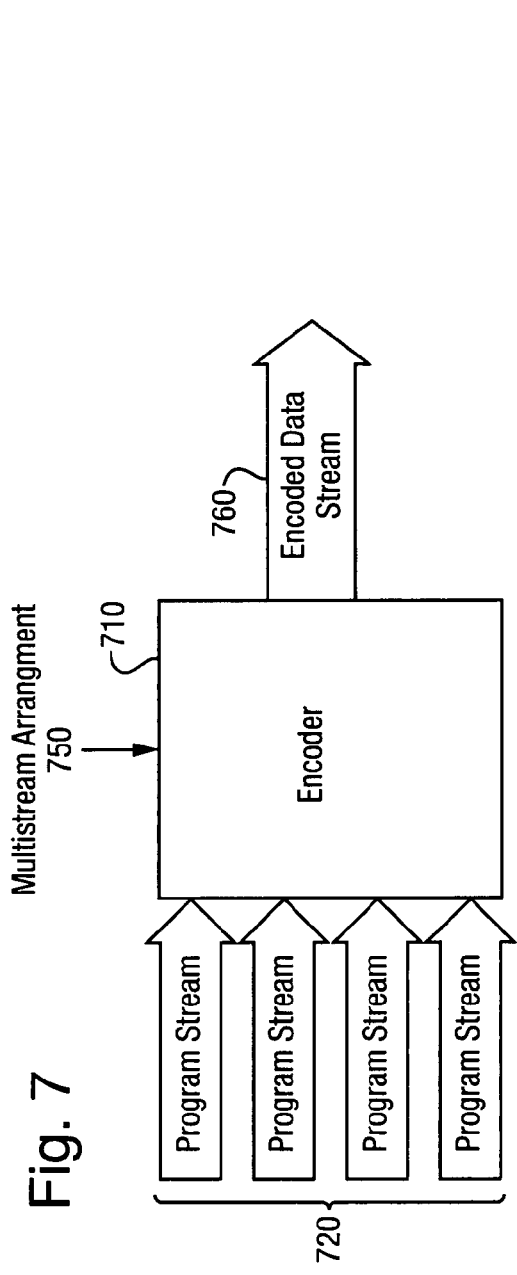
FIG. 7 shows an encoder arranged to receive a plurality of program streams and multistream arrangement information.

FIG. 7 shows an encoder 710 arranged to receive a plurality of program streams 720. The encoder 710 also receives multistream arrangement information 750. The encoder 710 encodes the program streams and the multistream arrangement information to create an encoded data stream 760.

Figure 8:
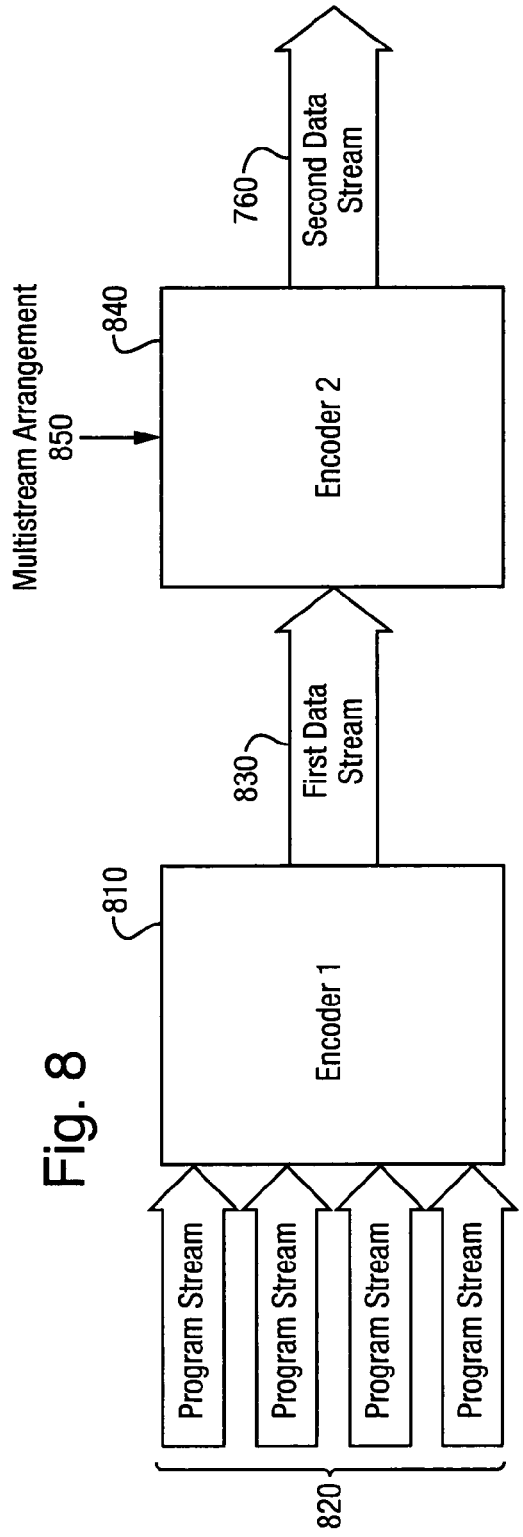
FIG. 8 illustrates an alternative to the arrangement of FIG. 7, the alternative comprising two encoders.

As an alternative to the arrangement of FIG. 7, FIG. 8 illustrates two encoders, 810 and 840. The first encoder 810 is arranged to receive a plurality of program streams 820. The first encoder 810 encodes the program streams to create a first encoded data stream 830. A second encoder 840 receives the first data stream 830 and also receives multistream arrangement information 850. The second encoder 840 encodes the multistream arrangement information and inserts it into the first data stream 830 to create a second encoded data stream 860. The first encoder 810 and second encoder 860 may reside in different servers.

Figure 9:
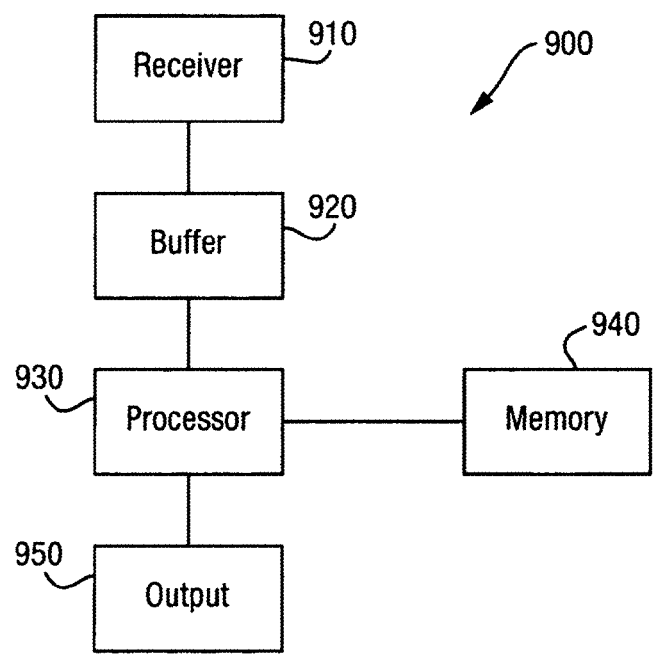
FIG. 9 illustrates an example encoder.

FIG. 9 illustrates an example encoder 900 suitable for performing the encoding tasks of encoders 710, 810 and 840 described above. The encoder 900 comprises a receiver 910, a buffer 920, a processor 930, a memory 940, and an output 950.

In operation, the receiver 910 receives the information for encoding (such as program streams and/or arrangement information) and stores this in a buffer 920. The processor 930 reads the information for encoding from the buffer 920 and encodes these to generate a data stream. The processor 930 is arranged to receive instructions which, when executed, cause the processor 930 to carry out the above described method. The instructions are stored on the memory 940. The encoded program is sent to an output 950. The outputting may comprise sending the encoded data stream to a transmitter for broadcast or other form of distribution.

Advantageously, if a receiver cannot interpret the multistream arrangement descriptor, then it will be ignored. As such the receiver will still be able to access the individual streams, and to output these individually. The solution described herein provides a solution for multiple streams bundled in to one package that can be accepted by all parts in the transmission chain, and that is independent of the middleware in the distribution network.

It will be apparent to the skilled person that the exact order and content of the actions carried out in the method described herein may be altered according to the requirements of a particular set of execution parameters. Accordingly, the order in which actions are described and/or claimed is not to be construed as a strict limitation on order in which actions are to be performed.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope.

While examples have been given in the context of particular communications standards, these examples are not intended to be the limit of the communications standards to which the disclosed method and apparatus may be applied. For example, while specific examples have been given in the context of MPEG transport streams, the principles disclosed herein can also be applied to any other video transport standard which uses content streams.

Further, while examples have been given in the context of a particular communications network, these examples are not intended to be the limit of the communications networks to which the disclosed method and apparatus may be applied. The principles disclosed herein can be applied to any communications network which carries media using streaming, including both wired IP networks and wireless communications networks such as LTE and 3G networks.

Where reference is made to HTTP Adaptive Streaming, these references are not intended to be the limit of streaming system to which the disclosed method and apparatus may be applied. The principles disclosed herein can be applied to any streaming system which uses a description file. For example, this method and apparatus may be applied to Apple™ HTTP Live Streaming, and Microsoft™ Smooth Streaming.

The invention claimed is:

1. A method of encoding a plurality of program streams into a data stream, comprising:
    an encoder receiving a plurality of program streams;
    the encoder encoding the plurality of received program streams to generate one data stream that includes the plurality of received program streams;
    the encoder generating at least one multistream descriptor that defines:
    a multistream group identifier;
    the identity of the program streams that are members of a multistream group, wherein the multistream group comprises the plurality of program streams for simultaneous display in a display arrangement, and
    a display arrangement of the plurality of program streams in the same data stream for simultaneous display; and
    the encoder inserting the generated at least one multistream descriptor into the data stream; and
    the encoder transmitting, to a decoder, the data stream having the plurality of program streams and the at least one multistream descriptor.

2. The method of claim 1, wherein the at least one multistream descriptor further includes an indicator to determine whether a user can modify the display arrangement.

3. The method of claim 1, wherein the at least one multistream descriptor further includes the priority of different streams in the stream group.

4. The method of claim 1, wherein the at least one multistream descriptor further includes an audio identifier to indicate which audio stream is to be played in conjunction with the multistream group.

5. The method of claim 1, wherein the at least one multistream descriptor is repeated within the data stream.

6. The method of claim 1, wherein the data stream is a transport stream.

7. The method of claim 6, wherein the at least one multistream descriptor is included in a Program Association Table, a Program Map Table, or a private data packet.

8. The method of claim 1, wherein the at least one multistream descriptor is included within one of the program streams.

9. The method of claim 1, wherein the data stream is an adaptive stream, and the at least one multistream descriptor is included within a manifest.

10. The method of claim 1, wherein the plurality of program streams in the data stream include different video streams.

11. The method of claim 10, wherein each of the plurality of program streams corresponds to output from a different camera.

12. A device for receiving a data stream, the device comprising:
    a receiver arranged to receive a data stream comprising a plurality of program streams and a multistream descriptor;
    a processor arranged to decode a group of the program streams in the data stream, the group indicated by the multistream descriptor; and
    an output device arranged to output the group of program streams in the same data stream for simultaneous display in a display arrangement as indicated by the multistream descriptor.

13. The device as claimed in claim 12, wherein the multistream descriptor comprises:
    a multistream group identifier; and
    the identity of the program streams that are members of the multistream group.

14. An encoder comprising at least one processor arranged to:
    receive a plurality of video streams and audio streams;
    encode the received video streams and received audio streams to generate a data stream that includes the received video streams and received audio streams;
    receive information describing a multistream arrangement comprising an arrangement of at least a plurality of the received video streams in the same data stream for simultaneous display in a display arrangement;
    encode the information describing the multistream arrangement in a multistream descriptor; and
    insert the multistream descriptor into the data stream.

15. An encoder comprising at least one processor arranged to:
    receive an encoded data stream comprising a plurality of program streams;
    receive information describing a multistream arrangement comprising an arrangement of at least a plurality of the received program streams in the same data stream for simultaneous display in a display arrangement;
    encode the information describing the multistream arrangement in a multistream descriptor; and insert the multistream descriptor into the encoded data stream.

16. A method in an encoder for creating a data stream including a multistream descriptor, the method comprising:
receiving a plurality of video streams and audio streams;
encoding the received video streams and received audio streams to generate a data stream that includes the plurality of received video streams and received audio streams;
receiving a multistream arrangement comprising an arrangement of at least a plurality of the received video streams in the same data stream for simultaneous display in a display arrangement;
encoding the multistream arrangement in a multistream descriptor; and
inserting the multistream descriptor into the data stream.

17. A non-transitory computer-readable medium, carrying instructions, which, when executed by a processor, causes said processor to carry out the method defined by claim 16.

* * * * *